United States Patent
Auxier et al.

(10) Patent No.: US 10,955,815 B2
(45) Date of Patent: Mar. 23, 2021

(54) METHOD OF MANUFACTURE USING AUTONOMOUS ADAPTIVE MACHINING

(71) Applicant: United Technologies Corporation, Farmington, CT (US)

(72) Inventors: James Tilsley Auxier, Bloomfield, CT (US); Alan C. Barron, Jupiter, FL (US); Norman W. Cofalka, Bernardsville, NJ (US)

(73) Assignee: Raytheon Technologies Corporation, Waltham, MA (US)

( * ) Notice: Subject to any disclaimer, the term of this patent is extended or adjusted under 35 U.S.C. 154(b) by 168 days.

(21) Appl. No.: 16/185,378

(22) Filed: Nov. 9, 2018

(65) Prior Publication Data
US 2020/0150616 A1    May 14, 2020

(51) Int. Cl.
G05B 19/402     (2006.01)
G05B 19/406     (2006.01)
F01D 5/14       (2006.01)

(52) U.S. Cl.
CPC .......... G05B 19/402 (2013.01); F01D 5/141 (2013.01); G05B 19/406 (2013.01); F05D 2230/14 (2013.01); F05D 2230/21 (2013.01); G05B 2219/33099 (2013.01)

(58) Field of Classification Search
None
See application file for complete search history.

(56) References Cited

U.S. PATENT DOCUMENTS

| | | | |
|---|---|---|---|
| 4,926,309 A | 5/1990 | Wu et al. | |
| 5,193,314 A | 3/1993 | Wormley et al. | |
| 7,329,832 B2 | 2/2008 | Hoebel et al. | |
| 7,797,828 B2 | 9/2010 | Beeson et al. | |
| 9,383,742 B2 | 7/2016 | Li et al. | |
| 9,802,288 B2 | 10/2017 | Rizzo, Jr. et al. | |
| 10,012,976 B2 | 7/2018 | Louesdon et al. | |

(Continued)

FOREIGN PATENT DOCUMENTS

WO    WO2018/132629 A1    7/2018

OTHER PUBLICATIONS

Kosler et al., "Adaptive Robotic Deburring of Die-Cast Parts with Position and Orientation Measurements Using a 3D Laser-Triangulation Sensor", Journal of Mechanical Engineering 2016 (Year: 2016).*

*Primary Examiner* — Carlos R Ortiz Rodriguez
(74) *Attorney, Agent, or Firm* — Kinney & Lange, P.A.

(57) ABSTRACT

A method of removing features from a cast workpiece includes generating a nominal toolpath for machining the cast workpiece. The cast workpiece is mounted onto a platform of a computer numeric control machine. The cast workpiece is inspected with a probe to generate probe data. Features to be removed are identified based upon the probe data generated during the inspection. Any expected features of the cast workpiece that are missing from the cast workpiece are identified. A transformation matrix is applied to the nominal toolpath with a controller of the computer numeric control machine, wherein the transformation matrix is based upon the probe data. Alignment of the cast workpiece is adjusted relative to the computer numeric control machine based on the transformation matrix with the computer numeric control machine. Features are removed from the cast workpiece that were identified during inspection.

18 Claims, 3 Drawing Sheets

(56) References Cited

U.S. PATENT DOCUMENTS

2008/0000611 A1* 1/2008 Bunker .................... B22C 9/22
164/138
2014/0075754 A1 3/2014 Barron et al.

* cited by examiner

METHOD OF MANUFACTURE USING AUTONOMOUS ADAPTIVE MACHINING

BACKGROUND

The present disclosure generally relates to manufacturing. In particular, the present disclosure relates to manufacturing involving autonomous adaptive machining of cast parts.

Gas turbine engine airfoils are often manufactured from castings tending to benefit from final machining for mating to attachments and adjacent surfaces. The investment casing process of super alloys, both in randomly orientated and directionally solidified single crystal methods, employs a variety of support, gating, and printout features enabling desirable design elements of the part. However, the addition of support, gating, and printout features tends to result in surface irregularities benefiting from removal, thereby tending to increase cycle time, manual-touch labor, and environmental health and safety challenges.

Additionally, removal of these features after production of the rough casting tends to induce part-to-part dimensional inconsistencies. These dimensional inconsistencies are exacerbated by conventional manual methods of removal such as, for example, belt grinding and other hand working. Furthermore, traditional hard-coded robotic or Computer Numerical Control ("CNC") methods of removal are unsuited to feature removal operations due to the inherent part-to-part variance in the rough castings resulting from the processes mentioned above.

SUMMARY

A method of removing features from a cast workpiece includes generating a nominal toolpath for machining the cast workpiece. The cast workpiece is mounted onto a platform of a computer numeric control machine. The cast workpiece is inspected with a probe to generate probe data. Features to be removed are identified based upon the probe data generated during the inspection. Any expected features of the cast workpiece that are missing from the cast workpiece are identified. A transformation matrix is applied to the nominal toolpath with a controller of the computer numeric control machine, wherein the transformation matrix is based upon the probe data. Alignment of the cast workpiece is adjusted relative to the computer numeric control machine based on the transformation matrix with the computer numeric control machine. Features are removed from the cast workpiece that were identified during inspection.

A method of manufacturing a cast workpiece includes first and second phases. The first phase includes importing a nominal net-state model of the cast workpiece to a three dimensional scanning system, creating a three dimensional scan of an example cast workpiece with the three dimensional scanning system, creating an index of at least one feature to identify and machine with the three dimensional scanning system, identifying a surface profile reference by feature with the three dimensional scanning system, and generating a nominal toolpath for each feature with a computer aided design utility. The second phase includes mounting the cast workpiece onto a platform of a computer numeric control machine. The cast workpiece can be probed with a sensor for an initial registration. An index of features can be looped through with the computer numeric control machine. A location and a contour that is surrounding a positive feature is probed with the sensor. Whether a feature is identified within limits is determined with a controller of the computer numeric control machine. A transformation matrix of the computer numeric control machine is calculated with the controller of the computer numeric control machine based on probe data from the sensor. The transformation matrix is applied to the nominal toolpath with the controller of the computer numeric control machine. The feature is machined with the computer numeric control machine. Whether the feature is a last feature of the cast workpiece is determined with the controller of the computer numeric control machine. The machining of the cast workpiece is completed with the computer numeric control machine.

The present summary is provided only by way of example, and not limitation. Other aspects of the present disclosure will be appreciated in view of the entirety of the present disclosure, including the entire text, claims, and accompanying figures.

Figure 1:
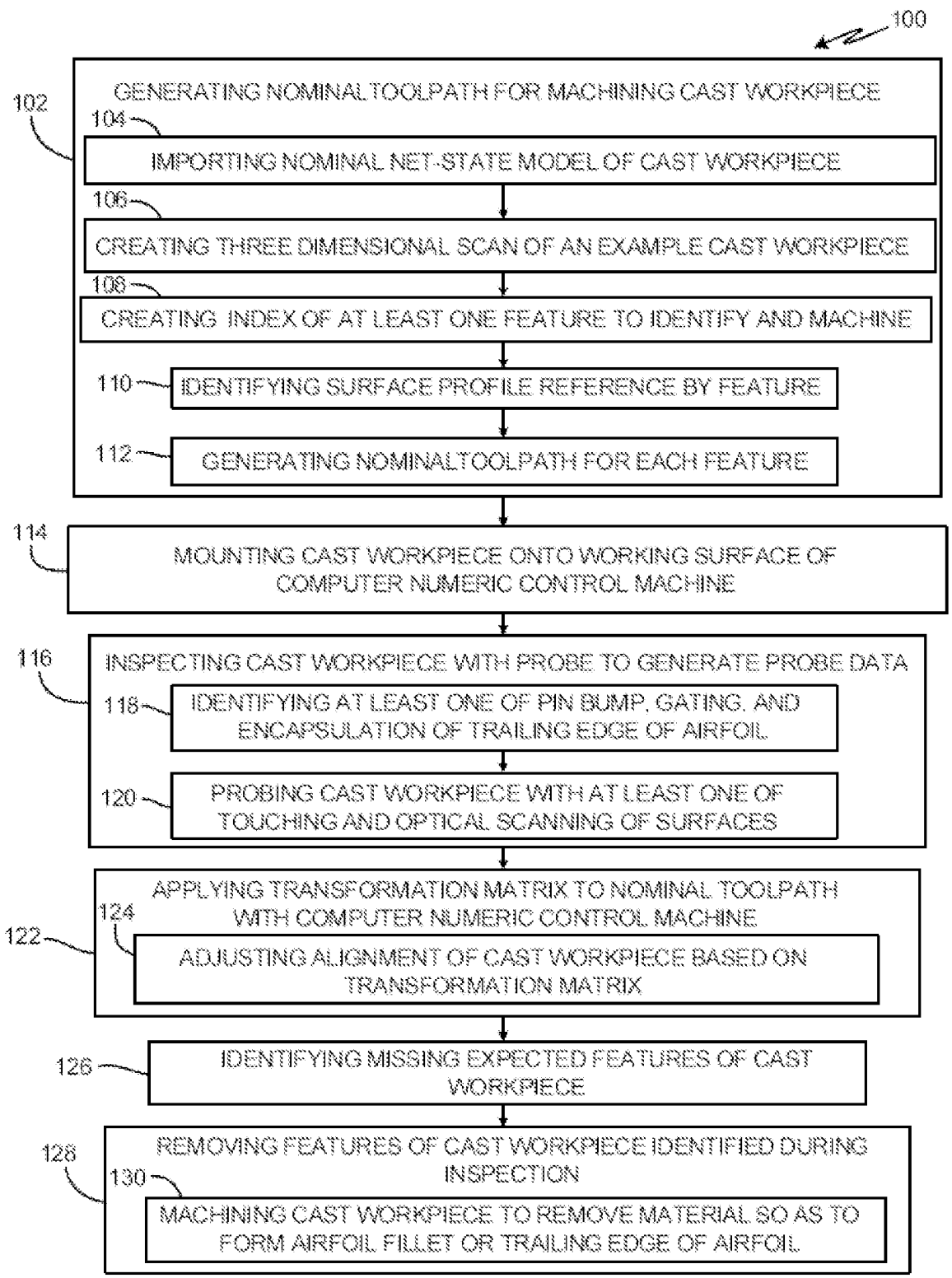
FIG. 1 is a flow chart of a method of autonomous adaptive machining a cast part.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure includes an autonomous adaptive machining manufacturing method for use with a computer numerical control ("CNC") machine. A cast workpiece is probed (e.g., optical, tactile, etc.), and a transformation matrix based upon the probe data is applied to nominal CNC toolpaths to adjust for the actual alignment of casting features to be machined, thereby reducing cycle time obviating any need for full three dimensional ("3D") scanning and computer aided manufacturing toolpath computation for each casting.

In one non-limiting embodiment, the cast workpiece includes a cast airfoil as a rough cast taken at the end of "lost wax" casting operations employing any of a variety of support, gating, and printout features and/or the like. The cast airfoil comprises a blade which extends from a platform and a base relatively beneath the platform. A span, a chord, and a section between a suction side and a pressure side describe the complex curves of the blade surface. An encapsulation of sacrificial material to be removed during manufacture may be produced in earlier manufacture stages to protect trailing edge features. In this non-limiting embodiment, features such as a plurality of casting artifacts (which may result from employing the various support, gating, and printout features during casting) extend from the blade surface.

After the cast airfoil is manufactured, the encapsulation is removed to expose trailing edge features. Any features (e.g., casting artifacts) are machined flush with blade surface. In this non-limiting embodiment, a system assembly comprises a 3D scanning system and a CNC machine with a controller. The 3D scanning system and/or the CNC machine further comprises a matching engine, a conformal-mapping engine, a tool operations engine, and the database. Any of these components can be outsources and/or be in communication with the controller of the CNC machine via a network. The system assembly is computer-based, and comprises a processor, a tangible non-transitory computer-readable memory, and/or a network interface, along with other suitable system software and hardware components. Instructions stored on the tangible non-transitory memory allows the system assembly to perform various functions, as described herein.

In this non-limiting embodiment, the controller of the CNC machine is configured as a network element or hub to access various systems, engines, and components of the system assembly. The controller of the CNC machine comprises a network, computer-based system, and/or software components configured to provide an access point to various systems, engines, and components of the system assembly. The controller the CNC machine is in operative and/or electronic communication with a matching engine, conformal-mapping engine, tool operations engine, and/or the database of either the 3D scanning system or the CNC machine.

In this non-limiting embodiment, the 3D scanning system comprises hardware and/or software configured to create a 3D scan of a work piece such as the cast airfoil. The 3D scanning system comprises, for example, a coordinate measuring machine, a contact probe, a structured light scanner (e.g., blue light, white light, etc.), a modulated light scanner, a laser scanner, acoustic sensor, thermal sensors, and/or the like. The 3D scanning system is configured to communicate with the CNC machine and to generate and transmit scan data, such as a point cloud, to the controller of the CNC machine.

In this non-limiting embodiment, the CNC machine comprises hardware and/or software configured to perform additive or subtractive manufacturing operations on a work piece such as the cast airfoil in response to instructions from the 3D scanning system. The CNC machine is configured to communicate with the 3D scanning system and receive tool instructions from the 3D scanning system. The CNC machine can comprise, for example, a grinding machine, a lathe, a milling machine, an electron beam welding machine, a layer-by-layer additive manufacturing device, an electrical discharge manufacturing machine, and/or the like. In this non-limiting embodiment, a tool instruction comprises data such as instructions for CNC toolpaths, G-codes, M-codes, layered additive programs, and/or the like.

In this non-limiting embodiment, the database comprises any number of data elements or data structures such as model data, match data, and features data. The database is configured to store data using any suitable technique described herein or known in the art. The database is configured to store digital models and data related to digital models of a work piece as model data. Model data comprises data such as accurate dimensional data, point clouds, an ideal airfoil model, a nominal airfoil model, and a conformal-mapped nominal airfoil model, or a difference map. Features data comprises data related to dimensional abnormalities of a work piece such as dimensional data, an index of features comprising a positive feature set and a negative feature set, or tool instructions.

Additional description and explanation of the above embodiments can be found in commonly owned U.S. Application No. 62/688,928 titled "SYSTEMS AND METHODS FOR AUTOMATED ADAPTIVE MANUFACTURING OF AIRFOIL CASTINGS," the disclosure of which is hereby incorporated in its entirety.

FIG. 1 is a flow chart of method 100 of machining a cast workpiece with a CNC machine to remove features according to a first embodiment. Method 100 includes steps 102 through 130.

Step 102 includes generating a nominal toolpath for machining the cast workpiece. Step 102 also includes steps 104-112. Step 104 includes importing a nominal net-state model of the cast workpiece to a 3D scanning system. The nominal net-state model of the cast workpiece is a perfect, as-designed model of a perfect version of the finished cast workpiece. Step 106 includes creating, with the 3D scanning system, a 3D scan of an example cast workpiece. Step 108 includes creating, with the 3D scanning system, an index of at least one feature to identify and machine. Step 110 includes identifying, with the 3D scanning system, a surface profile reference by feature. Step 112 includes generating the nominal toolpath for each feature.

Step 114 includes mounting the cast workpiece onto a platform of the CNC machine. Step 116 includes inspecting the cast workpiece with a probe to generate probe data. The probe includes a tactile, optical, computed tomography, X-ray (e.g., computed tomography), or infrared probe. For example, X-ray or infrared spectra can be used to probe and/or measure an actual condition of the workpiece. Computed tomography (e.g., computerized axial tomography) can also be used and offers advantages in determining the best finishing toolpaths based on an internal core position of the workpiece. Similarly, infrared thermal imaging can determine how to finish a part based on as-cast conditions compared to desired cooling characteristics. Step 116 also includes steps 118 and 120. Step 118 includes identifying at least one of a pin bump, a gating, and an encapsulation of a trailing edge of an airfoil. Step 120 includes probing the cast workpiece with at least one of touching and optical scanning of surfaces of the cast workpiece.

Step 122 includes applying a transformation matrix to the nominal toolpath with a controller of the CNC machine, wherein the transformation matrix is based upon the probe data. The transformation matrix comprises a series of entries as instructions for transforming the nominal toolpath to account for dimensional differences in a nominal net state model of the cast workpiece and the cast workpiece as-built. The series of entries in the transformation matrix are based on the probe data and represent changes to the nominal toolpath needed to adjust for the differences between the nominal net state and actual measurements of the cast workpiece as recorded in the probe data. Step 122 also includes step 124 of adjusting, with the CNC machine, alignment of the cast workpiece relative to the CNC machine based on the transformation matrix.

Step 126 includes identifying any expected features of the cast workpiece that are missing from the cast workpiece. Step 128 includes removing features from the cast workpiece that were identified during inspection in order to complete machining of the cast workpiece. Step 128 also includes step 130 of machining the cast workpiece to remove material so as to form an airfoil fillet or round a trailing edge of an airfoil.

Figure 2:
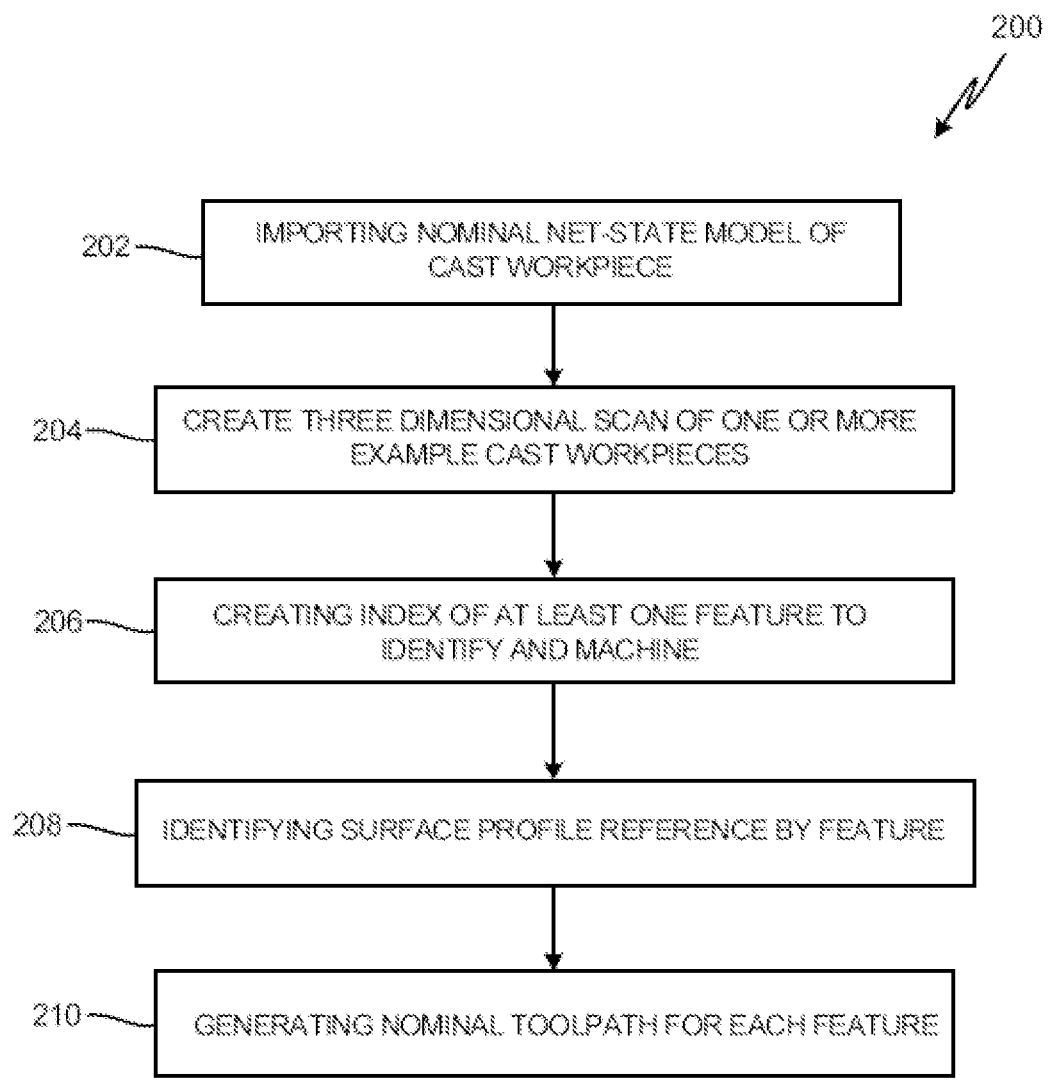
FIG. 2 is a flow chart of a first phase of a method of autonomous adaptive machining a cast part.

FIG. 2 shows a flow chart of first phase 200 of a method of manufacturing a cast workpiece according to a second embodiment.

Step 202 includes importing a nominal net-state model of the cast workpiece (e.g., an ideal airfoil model) to the 3D scanning system. Step 204 includes creating a 3D scan of one or more example cast workpieces with the 3D scanning system. The 3D scan data comprises a variety of point clouds corresponding to a plurality of rough cast airfoils. Each of the plurality of rough the cast airfoils may vary in chord, span, and section as may result from variance in the casting process. In another non-limiting embodiment, step 204 can include importing a computer aided design file of an example cast workpiece to a computer aided design utility. Step 206 includes creating, with the 3D scanning system, an index of at least one feature to identify and machine. In another non-limiting embodiment, step 206 can include creating an index of at least one feature to identify and machine with the computer aided design utility.

Step 208 includes identifying a surface profile reference by feature with the 3D scanning system. Here, the 3D scanning system identifies surface profile references such as encapsulations, casting artifacts, and/or dimples. Stated another way, for each of a plurality of rough the cast airfoils, the controller identifies areas of dimensional abnormality or non-conformity in a point cloud of each of the rough the cast airfoil. In another non-limiting embodiment, step 208 can include identifying a surface profile reference by feature with the computer aided design utility. Step 210 includes generating a nominal CNC toolpath for each feature with a computer aided design ("CAD") utility, such as a commercial off the shelf or customized (e.g., bespoke) CAD software or hardware tool. The CNC nominal toolpaths comprises a set of the CNC machine instructions generated, in response to the index of features and surface profile references, to configure the CNC machine to perform operations on identified features. The CNC nominal toolpaths are correlated to the feature set defining the index of features and saved as features data.

Figure 3:
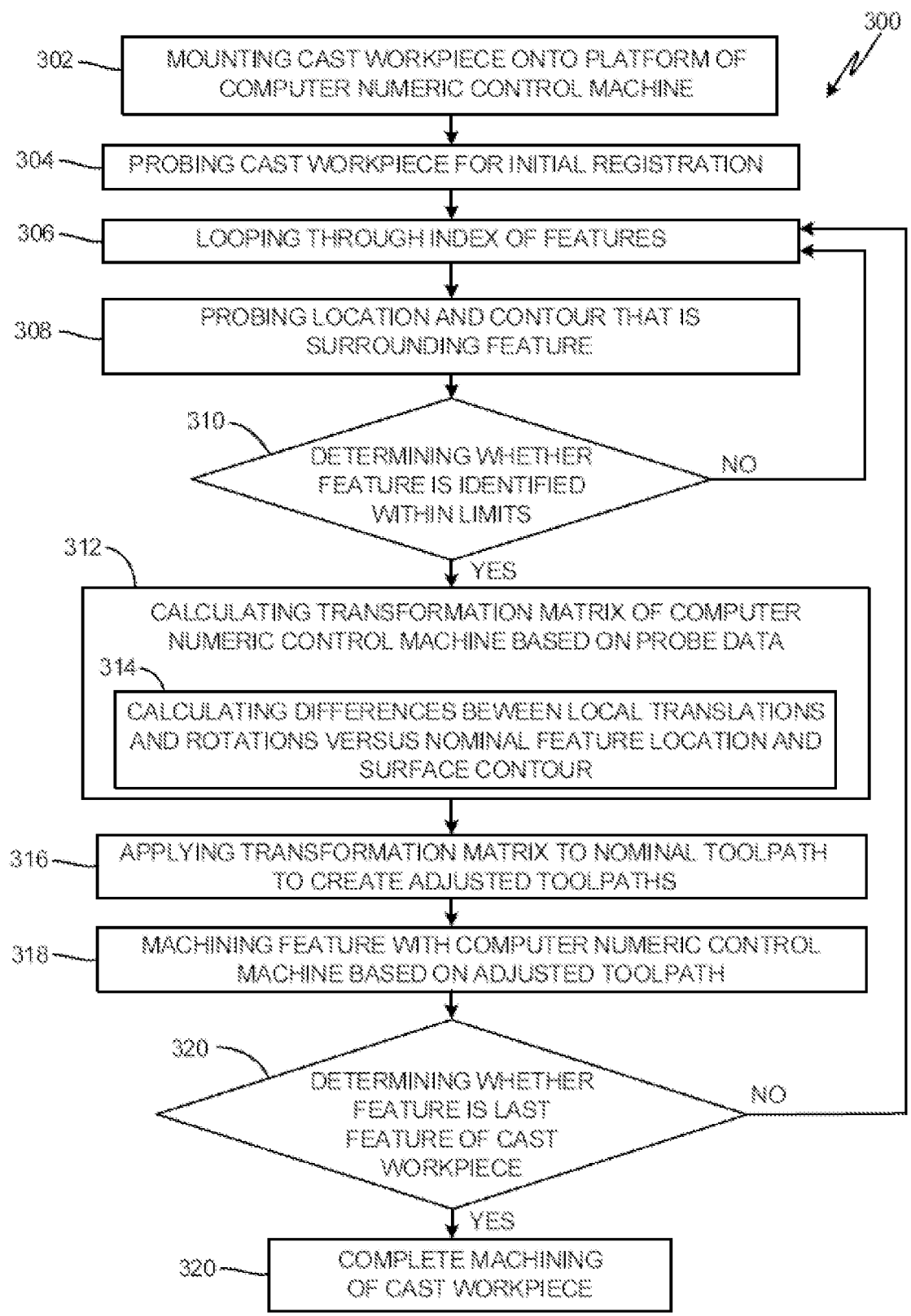
FIG. 3 is a flow chart of a second phase of the method of autonomous adaptive machining a cast part.

FIG. 3 is a flow chart of second phase 300 of the method of manufacturing a cast workpiece according to the second embodiment.

Step 302 includes mounting the cast workpiece onto a platform of a CNC machine. Step 304 includes probing the cast workpiece with a sensor for an initial registration. The sensor comprises a tactile probe or an optical probe. Here, the CNC machine scans the workpiece to generate a 3D scan of the workpiece. The controller of the CNC workpiece receives the 3D scan of the cast airfoil and registers the 3D scan against a reference model, such as an ideal airfoil model or a nominal reference airfoil model, to obtain a reference position.

Step 306 includes looping through an index of features with the CNC machine. In one non-limiting embodiment, this step can include cycling through the index of features created in step 206 in order to probe a location and contour of each feature (see e.g., step 308). Step 308 includes probing the location and the contour that is surrounding a feature (or features) with the sensor. Step 310 includes determining whether a feature is identified within limits. Based on the probed feature, the controller of the CNC machine determines for each feature whether the feature falls within an acceptable design limit or whether the feature must be altered. If the feature is not identified within limits in step 310, then step 306 is repeated. If the feature is identified within limits in step 310, then step 312 is executed.

Step 312 includes calculating a transformation matrix of the CNC machine with a controller of the CNC machine based on probe data from the sensor. Step 312 also includes step 314 of calculating differences between local translations and rotations versus a nominal feature location and a surface contour. The transformation matrix comprises a series of entries as instructions for transforming the nominal toolpath to account for dimensional differences in a nominal net state model of the cast workpiece and the cast workpiece as-built. The series of entries in the transformation matrix are based on the probe data and represent changes to the nominal toolpath needed to adjust for the differences between the nominal net state and actual measurements of the cast workpiece as recorded in the probe data.

Additionally, the CNC machine creates the transformation matrix to describe a function of the casting process variance with respect to the ideal airfoil model. The transformation matrix proportionally adjusts the dimensions of the ideal airfoil model to a best surface fit of a surface of the cast airfoil, such as blade surface. In various embodiments, the transformation matrix is generated or derived by a machine learning technique such as, for example, one of a supervised deep learning technique or an unsupervised deep learning technique applied to the plurality of scan data.

Step 316 includes applying the transformation matrix to the nominal toolpath to create adjusted toolpaths. Step 318 includes machining the feature with the CNC machine based on the adjusted toolpaths. Step 320 includes determining whether the feature is a last feature of the cast workpiece. If the feature is not the last feature in step 320, then step 306 is repeated. If the feature is the last feature in step 320, then step 322 is executed. Step 322 includes completing the machining of the cast workpiece.

In other non-limiting embodiments, methods 100, 200, and/or 300 can also be used to remove and/or shape other types of casting stock, such as the printout at the tip of an airfoil as well as applying a rounding to edges of a platform of the airfoil.

As compared to existing manufacturing methods, methods 100, 200, and 300 of this disclosure rely on the CNC machine's ability to be adaptive, as well as the 3D scanning system's capability to communicate to the CNC machine a lean description of toolpath instructions. The CNC machine then uses computational capacity it has, (e.g., autonomous, adaptive, etc.), to adjust its own code (e.g., toolpaths instructions). As compared to existing methods, this disclosure eliminates intermediary software/hardware and allows data from the 3D scanning system to be delivered directly to the CNC machine in a form that the CNC machine can read. For example, the CNC machine receives the features the CNC machine needs to go work on, the CNC machine uses its probes to find the surface (contour) and figure out where the features of the workpiece are, the CNC machine adapts based on the input(s), and then based on the current CNC toolpath it has, generates new toolpaths and executes the new toolpaths.

What these methods enable is the ability to take a part (e.g., cast workpiece) that can vary periodically in its overall dimensional condition and adapt the machining of that variable part to account for the variations. Benefits of the embodiments disclosed herein include reductions in part cost, in period cost for software licenses, computer leases, scanning equipment, training, and in cycle time without full 3D scanning and computer aided manufacturing toolpath computation for each casting. Further benefits include improvements in environmental health and safety, part quality, and design space.

Discussion of Possible Embodiments

The following are non-exclusive descriptions of possible embodiments of the present invention.

A method of removing features from a cast workpiece includes generating a nominal toolpath for machining the cast workpiece. The cast workpiece is mounted onto a platform of a computer numeric control machine. The cast workpiece is inspected with a probe to generate probe data. Features to be removed are identified based upon the probe data generated during the inspection. Any expected features of the cast workpiece that are missing from the cast workpiece are identified. A transformation matrix is applied to the nominal toolpath with a controller of the computer numeric control machine, wherein the transformation matrix is based upon the probe data. Alignment of the cast workpiece is adjusted relative to the computer numeric control machine based on the transformation matrix with the computer numeric control machine. Features are removed from the cast workpiece that were identified during inspection.

The method of the preceding paragraph can optionally include, additionally and/or alternatively, any one or more of the following steps, features, configurations and/or additional components.

At least one of a pin bump, a gating, and/or an encapsulation of a trailing edge of an airfoil can be identified.

The cast workpiece can be machined to remove material so as to form an airfoil fillet or round a trailing edge of an airfoil.

The cast workpiece can be probed with at least one of touching and optical scanning of surfaces of the cast workpiece.

The cast workpiece can be probed for an initial registration.

A nominal net-state model of the cast workpiece can be imported to a three dimensional scanning system; a three dimensional scan of an example cast workpiece can be created with the three dimensional scanning system; an index of at least one feature to identify and machine can be created with the three dimensional scanning system; a surface profile reference by feature can be identified with the three dimensional scanning system; and/or the nominal toolpath for each feature can be generated with a computer aided design utility.

A nominal net-state model of the cast workpiece can be imported to a three dimensional scanning system, a computer aided design file of an example cast workpiece to a computer aided design utility can be imported, an index of at least one feature to identify and machine can be created with the computer aided design utility, a surface profile reference by feature can be identified with the computer aided design utility, and/or the nominal toolpath for each feature can be generated with the computer aided design utility.

The probe can comprise a tactile, optical, X-ray, and/or infrared probe.

The transformation matrix can comprise a series of entries as instructions for transforming the nominal toolpath that can account for dimensional differences between a nominal net state model of the cast workpiece and/or the cast workpiece as-built.

The series of entries in the transformation matrix can be based on the probe data.

The series of entries can represent changes to the nominal toolpath needed to adjust for the differences between the nominal net state and actual measurements of the cast workpiece as recorded in the probe data.

A method of manufacturing a cast workpiece includes first and second phases. The first phase includes importing a nominal net-state model of the cast workpiece to a three dimensional scanning system, creating a three dimensional scan of an example cast workpiece with the three dimensional scanning system, creating an index of at least one feature to identify and machine with the three dimensional scanning system, identifying a surface profile reference by feature with the three dimensional scanning system, and generating a nominal toolpath for each feature with a computer aided design utility. The second phase includes mounting the cast workpiece onto a platform of a computer numeric control machine. The cast workpiece can be probed with a sensor for an initial registration. An index of features can be looped through with the computer numeric control machine. A location and a contour that is surrounding a positive feature is probed with the sensor. Whether a feature is identified within limits is determined with a controller of the computer numeric control machine. A transformation matrix of the computer numeric control machine is calculated with the controller of the computer numeric control machine based on probe data from the sensor. The transformation matrix is applied to the nominal toolpath with the controller of the computer numeric control machine. The feature is machined with the computer numeric control machine. Whether the feature is a last feature of the cast workpiece is determined with the controller of the computer numeric control machine. The machining of the cast workpiece is completed with the computer numeric control machine.

The method of the preceding paragraph can optionally include, additionally and/or alternatively, any one or more of the following steps, features, configurations and/or additional components.

Local translations and rotations can be calculated versus a nominal feature location and a surface contour.

If the feature is not identified within limits, then looping through the index of features with the computer numeric control machine can be repeated.

If the feature is identified within limits, then the transformation matrix of the computer numeric control machine can be calculated based on probe data from the sensor with the controller of the computer numeric control machine.

If the feature is not the last feature, then then looping through the index of features with the computer numeric control machine can be repeated.

If the feature is the last feature, then whether the feature is a last feature of the cast workpiece can be determined with the computer numeric control machine.

The sensor can comprise a tactile, optical, X-ray, and/or infrared probe.

The transformation matrix can comprise a series of entries as instructions for transforming the nominal toolpath to account for dimensional differences between a nominal net state model of the cast workpiece and the cast workpiece as-built.

The series of entries in the transformation matrix can based on the probe data.

The series of entries can represent changes to the nominal toolpath needed to adjust for the differences between the nominal net state and actual measurements of the cast workpiece as can be recorded in the probe data.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodi-

The invention claimed is:

1. A method of removing features from a cast workpiece, the method comprising:
generating a nominal toolpath for machining the cast workpiece;
mounting the cast workpiece onto a platform of a computer numeric control machine;
inspecting the cast workpiece with a probe to generate probe data, wherein inspecting the cast workpiece comprises identifying at least one of a pin bump, a gating, and an encapsulation of a trailing edge of an airfoil;
identifying features to be removed based upon the probe data generated during the inspection;
identifying any expected features of the cast workpiece that are missing from the cast workpiece;
applying a transformation matrix to the nominal toolpath with a controller of the computer numeric control machine, wherein the transformation matrix is based upon the probe data;
adjusting, with the computer numeric control machine, alignment of the cast workpiece relative to the computer numeric control machine based on the transformation matrix; and
removing features from the cast workpiece that were identified during inspection.

2. The method of claim 1, wherein removing features of the cast workpiece comprises machining the cast workpiece to remove material so as to form an airfoil fillet or round a trailing edge of an airfoil.

3. The method of claim 1, wherein inspecting the cast workpiece comprises probing the cast workpiece with at least one of touching and optical scanning of surfaces of the cast workpiece.

4. The method of claim 3, wherein inspecting the cast workpiece further comprises probing the cast workpiece for an initial registration.

5. The method of claim 1, wherein generating the nominal toolpath for machining the cast workpiece comprises:
importing a nominal net-state model of the cast workpiece to a three dimensional scanning system;
creating, with the three dimensional scanning system, a three dimensional scan of an example cast workpiece;
creating, with the three dimensional scanning system, an index of at least one feature to identify and machine;
identifying, with the three dimensional scanning system, a surface profile reference by feature; and
generating, with a computer aided design utility, the nominal toolpath for each feature.

6. The method of claim 1, wherein generating the nominal toolpath for machining the cast workpiece comprises:
importing a nominal net-state model of the cast workpiece to a three dimensional scanning system;
importing a computer aided design file of an example cast workpiece to a computer aided design utility;
creating, with the computer aided design utility, an index of at least one feature to identify and machine;
identifying, with the computer aided design utility, a surface profile reference by feature; and
generating, with the computer aided design utility, the nominal toolpath for each feature.

7. The method of claim 1, wherein the probe comprises a tactile, optical, X-ray, or infrared probe.

8. The method of claim 1, wherein the transformation matrix comprises a series of entries as instructions for transforming the nominal toolpath to account for dimensional differences between a nominal net state model of the cast workpiece and the cast workpiece as-built.

9. The method of claim 8, wherein the series of entries in the transformation matrix are based on the probe data.

10. The method of claim 8, wherein the series of entries represent changes to the nominal toolpath needed to adjust for the differences between the nominal net state and actual measurements of the cast workpiece as recorded in the probe data.

11. A method of manufacturing a cast workpiece, the method comprising:
a first phase comprising:
i. importing, to a three dimensional scanning system, a nominal net-state model of the cast workpiece;
ii. creating, with the three dimensional scanning system, a three dimensional scan of an example cast workpiece;
iii. creating, with the three dimensional scanning system, an index of at least one feature to identify and machine;
iv. identifying, with the three dimensional scanning system, a surface profile reference by feature; and
v. generating, with a computer aided design utility, a nominal toolpath for each feature; and
a second phase comprising:
vi. mounting the cast workpiece onto a platform of a computer numeric control machine;
vii. probing, with a sensor, the cast workpiece for an initial registration;
viii. looping, with the computer numeric control machine, through an index of features;
ix. probing, with the sensor, a location and a contour that is surrounding a positive feature;
x. determining, with a controller of the computer numeric control machine, whether a feature is identified within limits;
xi. calculating, with the controller of the computer numeric control machine, a transformation matrix of the computer numeric control machine based on probe data from the sensor;
xii. applying, with the controller of the computer numeric control machine, the transformation matrix to the nominal toolpath;
xiii. machining the feature with the computer numeric control machine;
xiv. determining, with the controller of the computer numeric control machine, whether the feature is a last feature of the cast workpiece; and
xv. completing, with the computer numeric control machine, the machining of the cast workpiece.

12. The method of claim 11, wherein calculating the toolpath of the computer numeric control machine comprises calculating local translations and rotations versus a nominal feature location and a surface contour.

13. The method of claim 11, further wherein:
if the feature is not identified within limits in step x, then repeat step viii; or
if the feature is identified within limits in step x, then go to step xi.

14. The method of claim 11, further wherein:
if the feature is not the last feature in step xiv, then repeat step viii; or
if the feature is the last feature in step xiv, then go to step xv.

15. The method of claim 11, wherein the sensor comprises a tactile, optical, X-ray, or infrared probe.

16. The method of claim 11, wherein the transformation matrix comprises a series of entries as instructions for transforming the nominal toolpath to account for dimensional differences between a nominal net state model of the cast workpiece and the cast workpiece as-built.

17. The method of claim 16, wherein the series of entries in the transformation matrix are based on the probe data.

18. The method of claim 16, wherein the series of entries represent changes to the nominal toolpath needed to adjust for the differences between the nominal net state and actual measurements of the cast workpiece as recorded in the probe data.

* * * * *